COLOR CAMERA OUTPUT SAMPLING SYSTEM
Original Filed Dec. 29, 1950
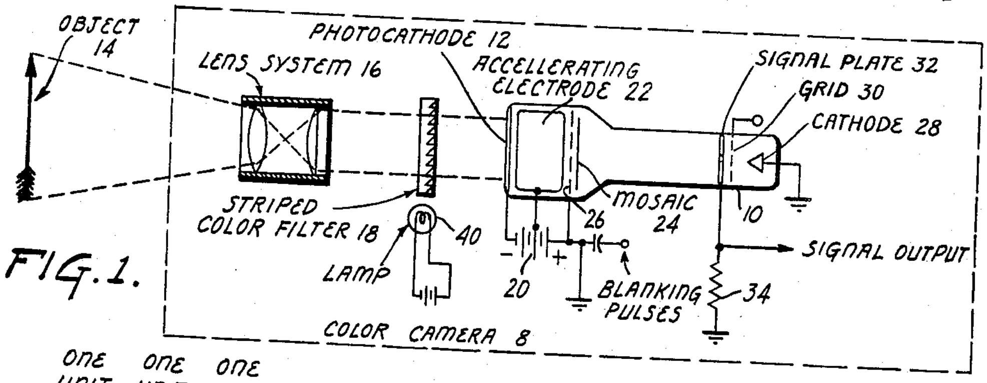
FIG. 1.
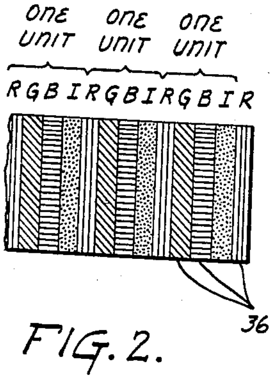
FIG. 2.
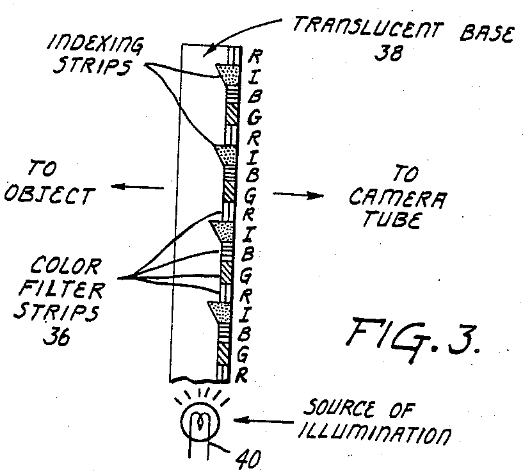
FIG. 3.
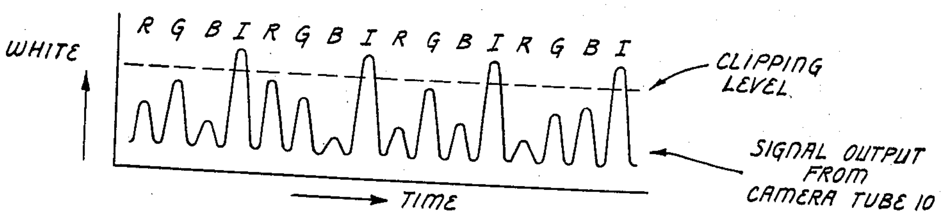
FIG. 4.
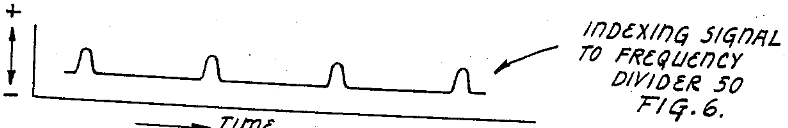
FIG. 6.
FIG. 5.
INVENTORS
WILSON P. BOOTHROYD
EDGAR M. CREAMER, JR.
BY
Oscar V. Hazeltine
ATTORNEY

COLOR CAMERA OUTPUT SAMPLING SYSTEM

Original Filed Dec. 29, 1950

3 Sheets-Sheet 2

INVENTORS
WILSON P. BOOTHROYD
EDGAR M. CREAMER, JR.

BY [signature]

ATTORNEY

INVENTORS
WILSON P. BOOTHROYD
EDGAR M. CREAMER, JR.
BY
[signature]
ATTORNEY

United States Patent Office 2,922,837

Patented Jan. 26, 1960

2,922,837

COLOR CAMERA OUTPUT SAMPLING SYSTEM

Wilson P. Boothroyd, Huntingdon Valley, and Edgar M. Creamer, Jr., Philadelphia, Pa., assignors to Philco Corporation, Philadelphia, Pa., a corporation of Pennsylvania Original application December 29, 1950, Serial No. 203,248, now Patent No. 2,769,855, dated November 6, 1956. Divided and this application December 30, 1955, Serial No. 556,749

18 Claims. (Cl. 178—5.4)

This application is a division of application Serial No. 203,248, filed December 29, 1950, now U.S. Patent No. 2,769,855, granted November 6, 1956.

The present invention relates to a television transmitting system of the type in which an optical image is analyzed into its primary, or component, colors through the medium of a single camera tube having but one electron scanning beam therein. The invention further relates to an improved form of indexing arrangement for use with such a camera tube to overcome the effects of a nonlinear scanning of the tube target area.

At the present time, all color television systems may be generally classified as being either "simultaneous" or "sequential" with respect to the manner in which the image information is conveyed. In the former, a plurality of camera tubes are utilized to develop concurrently a plurality of signal trains, each of which is representative of one of the component colors of the object. These individual signal trains are then transmitted at the same time through separate channels and employed respectively to modulate the beams of separate image-reproducing tubes at a receiver. The light from each tube may then be focused through an appropriate color filter onto a translucent screen in such a manner that the separate component color images are effectively superimposed for viewing by an observer.

Due principally to the excessive bandwidth requirements of the simultaneous system, however, it has largely been replaced by the sequential method of transmission. The latter may be further subdivided according to the particular manner in which the analysis is carried out, that is—field-by-field, line-by-line, or dot-by-dot. The first of these, the so-called "field-sequential" method, is well known, and may include a plurality of component-color filters which are successively interposed between the photosensitive electrode of the camera tube and the object which is to be televised. This interposition of the filter elements is carried out mechanically by some such means as a rotating disc or drum. In other words, the field-sequential system employs means whereby an object field may be successively scanned in the primary colors, the color values thus being assigned to successive color fields of the image, and the signals corresponding to these successive fields transmitted through a single channel.

The so-called "line-sequential" method of color image representation employs successively traced image lines which appear at the receiver in different colors. It differs therefore from the field-sequential method, in which each separate field is produced in one color only, with the colors changing from field-to-field through groups of colors which are selected so as additively to produce a polychrome visual image. This method also differs fundamentally from the simultaneous system, in which separate image rasters of the additive visual polychrome summation are separately traced or produced simultaneously in the respective selected component colors.

The last of the above-mentioned sequential methods, in which the object to be transmitted is analyzed dot-by-dot, employs a sampling technique to obtain a series of pulses of video signal energy, with the amplitude of each such pulse being determined by the ordinate of the video signal at the precise instant at which the pulse is developed. For example, three component-color signals may be respectively developed by three separate camera tubes, each such color signal being similar to that which is developed in the simultaneous system above referred to. The signal in each of these video channels accordingly is continuously present, and is sampled in some preferred manner so as to yield a component-color pulse train. Then, by means of multiplexing, the three component-color pulse trains are interleaved into a composite-color pulse train. While this composite-color pulse train is amplitude modulated, nevertheless the amplitudes of adjacent pulses are entirely independent, inasmuch as they represent separate chromatic aspects of the optical image. After being filtered, the composite pulse train is transmitted in any suitable manner.

One important requisite of any dot-sequential television arrangement as presently known is that the spacing between the pulses of the composite-color pulse train be uniform. In other words, for effective multiplexing, it is necessary that the sampling operation be carried out at a constant rate. Any departure of such operation from uniformity will result in interference between adjacent pulses and corresponding distortion of the image when it is reproduced at the receiver. Thus, successful multiplexing of the component-color signals (without a prohibitive amount of crosstalk therebetween) requires a precise dot, or pulse, spacing, both of the pulses in each component-color train as well as of the interleaved pulses in the composite-color train. For that reason, a dot-sequential television system is normally dependent upon uniform sampling, or, in other words, upon the color information present at the camera tube being sampled at a rate which is unvarying with respect to time. An extended discussion of the need for precise time-spacing of dot-sequential color pulses is given in an article by W. P. Boothroyd in the December 1949, issue of the publication "Electronics" on pages 88–92. Further effects resulting from an irregular pulse spacing in a time division multiplexing system are brought out in the AIEE Technical Paper #49–25 by W. P. Boothroyd and E. M. Creamer, Jr., dated December 1948.

The above reference to dot-sequential transmission applies to arrangements employing separate camera or pick-up tubes, each of which is adapted to produce a signal representative of but one component color of the optical image. In such cases, the output of each camera tube is a continuous signal, and may be sampled at arbitrarily chosen instants to produce a representative video pulse train. While it will be readily apparent that the video output of each camera tube must be available at each instant of sampling, this is of course the case with a system employing a plurality of pick-up units, inasmuch as each tube produces a video output of but a single color.

While a system of the above nature operates to produce an image at the receiver, it is excessively complex and costly. Accordingly, it is desirable to eliminate the necessity for employing separate camera tubes for each component color, and instead utilize a single pick-up tube in the output of which all of the component-color signals are present. In a system embodying the present invention, this is preferably accomplished by providing an optical assembly between the camera tube and the object to be televised so that each elemental area of the optical image is presented to the photosensitive electrode of the camera tube in a plurality of component colors. In a preferred arrangement, these component colors may be arranged in groups, or units, each of which includes a representation of the value of a particular elemental area of the image with respect to all the component colors. For example, the optical arrangement mentioned may comprise a filter having a plurality of sets, or groups, of parallel strips, each strip in the group passing light therethrough of substantially one color only. Thus each fundamental area of the image to be televised is caused to develop separate photo-electric charges on the camera tube mosaic representative of the component colors of such elemental area. As the cathode-ray scanning beam traverses the charged portions of the mosaic, component-color signals are successively developed, and appear sequentially at the output of the camera tube. It is of course apparent that each signal developed by the camera tube as the electron beam scans a charged area of the mosaic represents in effect a "sample" or indication of the chromatic characteristics of the optical image with respect to that particular elemental portion. Hence, the output of the camera tube may be considered to constitute a series of samples which are capable of being transmitted directly through a communication channel.

When the output of the single camera tube in such a color television system is transmitted directly, the spacing between the pulses will not necessarily be constant or uniform unless the cathode-ray scanning beam of the tube is deflected in a manner which is exactly linear with respect to time. Any nonlinearities such as might be caused, for example, by distortions in the shape of the scanning waveform, will result in a series of output pulses the spacing between which may vary from one portion of each line-scan to another portion thereof. This may in some cases produce a recognizable image providing that a scanning operation is present at the receiver which includes the same type of nonlinearity as that present at the transmitter. In practice, however, this is extremely difficult to achieve, and hence for commercial purposes it has been thought necessary to provide some means whereby both the scanning operations may be made as linear as possible without the employment of excessively costly apparatus. Some arrangements have even contemplated various forms of "servo" mechanisms, in which the actual rate of deflection is compared electrically to an ideal wave, and any departures from coincidence used to generate a so-called "error" voltage which then becomes effective either to speed up or slow down the scanning beam according to its direction and magnitude of departure from the ideal condition. Moreover, as brought out in the "Electronics" article above referred to, a direct transmission of unequally-spaced pulses usually results in an excessive amount of crosstalk between the signals of adjacent channels. Consequently, the present invention provides means whereby this objectionable effect of scanning nonlinearity is overcome.

Another disadvantage in the transmission of camera signals directly through a communication channel is that the rate at which the scanning beam crosses the individual component-color sections of the mosaic may be entirely distinct from the rate at which it is desired to transmit the color information to the receiver. For instance, restrictions on the width of the channel may require a rate of dot transmission which is lower than the rate at which the samples are derived from the camera tube. However, any discrepancy between the sampling rate and the transmission rate is obviously impossible in systems whereby the derived pulse train is transmitted directly.

It has been found possible to employ a camera tube having a sequential pulse output as above described so that the transmitted signal has a pulse rate completely independent of the rate at which the pulses are developed by the camera tube. This can be achieved in accordance with one feature of the present invention by separating the composite camera signal into three individual signals each of which contains information as to but one of the component colors. For example, the camera tube output may be gated sequentially to three separate color channels, each of which then receives only the pulses representative of a particular color. If appropriate filters or integrating means are employed, the output of each channel will constitute a single substantially continuous color-component signal closely approximating that which might be obtained from a simultaneous system employing a plurality of camera tubes for the various colors and in which due attention is given to linearity of beam deflection. The three gated, or separated, color-component signals may then be employed in any type of transmission system, whether it be of the simultaneous variety or whether it makes use of the field-, line-, or dot-sequential principle. With the separate component-color signals now available continuously, final sampling of these signals, for example, may be carried out at any desired rate for the purpose of developing a composite-color pulse train for dot-sequential transmission in which substantially no crosstalk is present between the various colors. It will be seen that in such case the rate of final sampling need bear no particular relationship to the operation by which the sequential signal output of the camera tube is gated into the separate color signal channels.

The above discussion has assumed that a linear scanning operation is present in the single camera tube from which the sequential color output is obtained, since with a constant, or uniform, gating apparatus following the camera tube, coincidence of operation is essential in order to avoid serious distortion. It will be obvious that representative signals are present in the output of the camera tube only at the exact instants when the cathode-ray scanning beam is traversing the charged areas of the mosaic. Hence, gating a signal channel to the camera tube output at any other instant will not yield the desired color information. It therefore follows that the cathode-ray beam deflection must be carried out at the same uniform rate as the gating operation. Even slight departures from linearity of scan in such a system will cause severe distortion of the reproduced image, and may even result in a completely different color presentation at the receiver from that which is actually represented by the optical image. This is so because the signals of on component color may be gated into channels reserved for signals of another component color if the gating is done at a regular rate and the beam deflection is asynchronous therewith.

In accordance with a still further feature of the present invention, means are provided whereby the objectionable effects of scanning nonlinearities are overcome, this being accomplished without the necessity of utilizing so-called "servo" circuits to linearize the deflecting operation. In the disclosed system, such scanning nonlinearities are allowed to remain, and the gating action is controlled so that instead of being carried out at a constant rate, it occurs nonlinearly in synchronism with the nonlinear scanning of the camera tube mosaic. If the color filter arrangement previously mentioned is constructed so that some regulating or controlling signal is derived therefrom indicative of the progress of the cathode-ray beam across successive component-color charge areas of the mosaic, then this controlling or regulating signal may be employed to modify the normal uniform operation of the gating mechanism. One preferred method of deriving such a controlling or regulating signal is to form the color filter so that each unit thereof comprises (for a tricolor additive television system utilizing the red, green and blue primary colors) not three but instead four areas; one of which is adapted to produce the regulating signal each time it is traversed by the cathode-ray beam. For example, each unit or group of component-color areas may include (sequentially as viewed by the scanning beam) a red area, a blue area, a green area and an indexing area. The latter area is designed so as to produce a characteristic signal output from the camera tube that is different from that which would normally be produced by the scanning of the red, green and blue areas. Thus, in scanning the camera tube mosaic, signals from the red, green and blue image portions plus an indexing pulse will be sequentially derived. If the scanning is not carried out at a linear rate, the sucessive interleaved pulses will vary in their spacing, and similarly the time interval between each indexing pulse will vary. However, these indexing pulses from the camera tube (after being clipped and shaped if necessary) may be used as control or regulating pulses to trigger the individual color signal separators. Consequently, the composite pulse output from the camera tube may be diverted to the three separate video channels in such time relation that each signal channel receives samples only of its particular component-color information. If the normal delay period between successive triggerings of the same separator is made slightly greater than the maximum time required for the cathode-ray beam to cross one photosensitive unit, or group of component-color areas, then the gating system will normally stop until it is next triggered by the passage of the beam over the following indexing strip. Thus, the component-color signals may be directed into their proper channels even though the scanning operation of the cathode-ray beam departs considerably from a linear condition.

When the component-color pulse trains which have been separated in the above manner are respectively applied to low-pass filters each having a bandwidth which is slightly less than the average sampling frequency, then the output of each filter may be considered to be essentially the same output as that derived from one camera tube of a multi-tube simultaneous color system having substantially linear deflection. If a further sampler is then utilized which operates at a uniform rate, it is possible to obtain a dot-sequential color output for transmission which has precise dot spacing even though the rate at which the samples are initially developed in the output of the camera tube is appreciably nonlinear.

While the particular structure for obtaining the regulating or controlling signals from the camera tube is not material insofar as the above system is concerned, nevertheless it is preferred to employ a color filter construction which produces these indexing signals in a particularly efficient manner. It has been mentioned above that each group of charges on the photosensitive electrode of the camera tube consists of four separate areas (for a tricolor television system of the nature described) so that each such unit or group contains red, green and blue areas plus an indexing charge area. A color filter for developing such charges may be constructed by forming channelizing strips in the filter base between each bundle, or unit, of red, green and blue color filter strips. If the material of which the filter base is made is translucent, and if the channelizing strips are filled with a diffusing material, then the filter may be edge-lighted so that each channelizing strip will stand out prominently with respect to the illumination received through the color filter strips, and the signal on the camera tube photosensitive surface will be greater in response to the light received from the channelizing strips than it will be for the light received through any one of the color filter areas. Consequently, a scanning of the camera tube mosaic which has been energized by light from such a color filter will provide indexing signals the amplitude of which normally exceeds the amplitude of any of the component-color signals. Alternatively, the diffusing material may be omitted, and the channelizing operation so carried out that at least one surface of each cut or indentation causes the incident indexing light rays to exceed the critical angle of refraction and be directed in the general direction of the camera tube. If desired, a very minute lens may be located in the path of each bundle of refracted light rays to bring them into substantially parallel relationship with the filtered image light.

One object of the present invention, therefore, is to provide an improved form of color television transmitter of the sequential type employing a single camera tube having only one scanning beam therein.

Another object of the present invention is to provide an improved form of color television transmitting system having a single camera tube designed to analyze an optical image in its primary, or component, colors, such tube developing an output signal in which information respecting these component colors appear sequentially.

A further object of the invention is to provide for the integration of a periodic pulse energy so as to yield a continuous wave which may then be sampled at equally-spaced time instants to develop a pulse train suitable for time-multiplexing with a minimum of crosstalk.

A still further object of the present invention is to provide a color television transmitting system of the type described in which the sequentially developed signal is converted into a plurality of continuous component-color signals, and further to provide for the effective re-sampling of these continuous signals by means operating independently of the converting means.

An additional object of the invention is to provide, in a color television transmitting system of the sequential type employing but a single camera tube, means for sequentially gating the output of the camera tube to a plurality of component-color signal channels in such a manner that each such channel receives information respecting one of the component colors only.

Other objects and advantages will be apparent from the following description of a preferred form of the invention and from the drawings, in which:

Figure 1 is a schematic representation of a color camera employing a preferred form of optical system;

Figure 2 is a face view of the striped color filter assembly of Figure 1, showing the relative positions of the indexing strips with respect to the component-color filter strips;

Figure 3 is a plan view of the color filter assembly of Figure 2, showing the manner in which the indexing strips are illuminated;

Figure 4 is a waveform of one possible output of the camera of Figure 1 when operating linearly as part of a color television transmitter;

Figure 5 illustrates one possible indexing signal derived by clipping the waveform of Figure 4;

Figure 6:
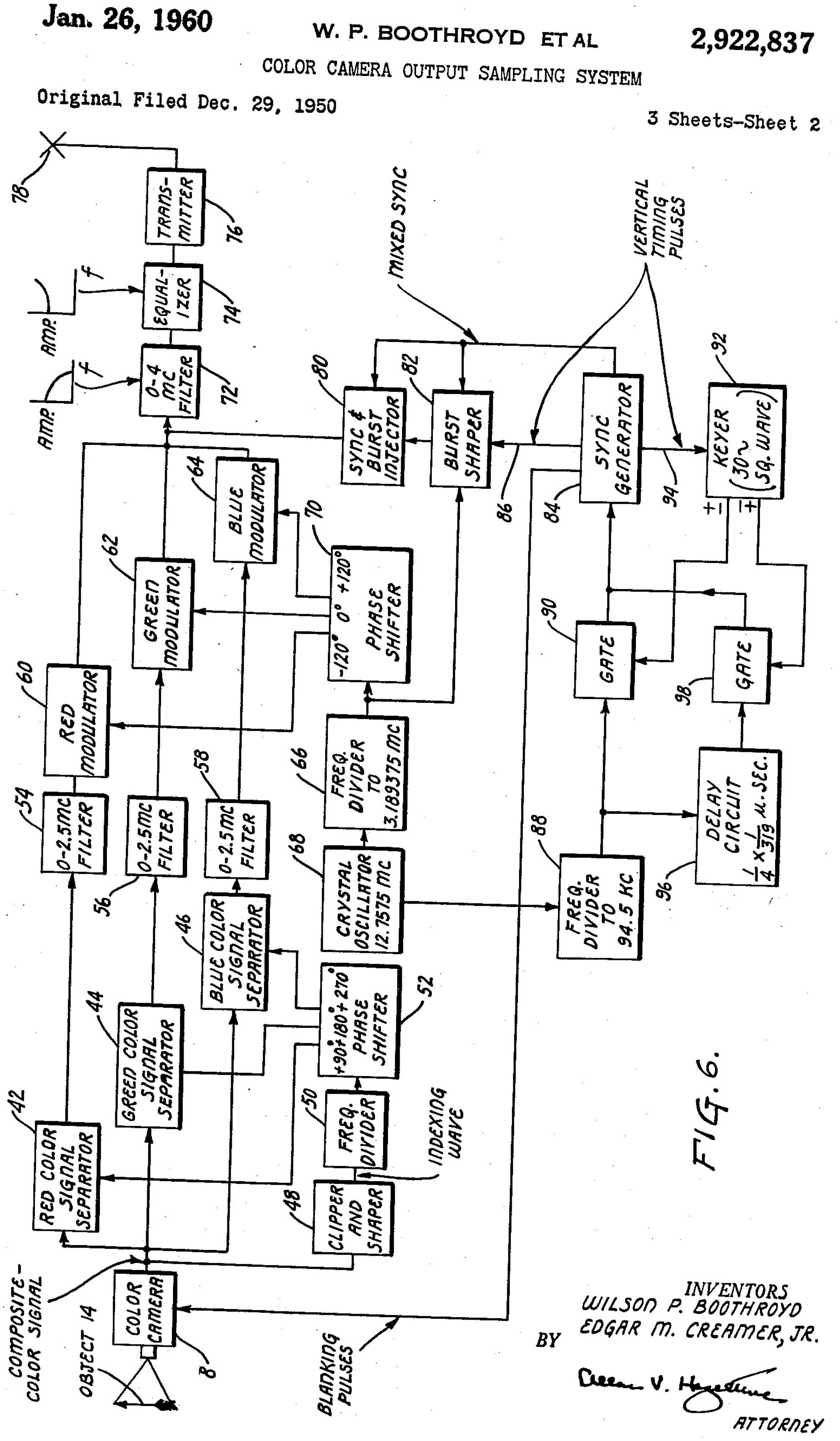
Figure 6 is a block diagram of a complete color television transmitter designed in accordance with a preferred embodiment of the present invention.

Referring now to Figure 1, there is shown a color television camera 8 which includes a single pick-up tube 10. This tube 10 as illustrated is of the well-known image Orthicon type, and hence the details thereof need not be described in the present application. However, the tube will be understood to include a photocathode 12, on which an image of an object 14 is focused by means of a lens system 16 through a striped color filter 18. Photocathode 12 is connected to the negative terminal of a battery 20 or other source of potential. Illumination falling on photocathode 12 causes an emission of electrons from the inner surface thereof, such emission, as is understood in the art, being in the form of an electron image each point of which corresponds in density to the strength of the illumination on the corresponding point of photocathode 12.

The velocity of the electrons thus emitted from the surface of photocathode 12 is increased by an accelerating electrode 22 (which is shown as an annular band of metal on the wall of tube 10, but which may be of any other suitable type, and which is connected to an intermediate point on battery 20) toward a mosaic electrode 24.

Mosaic 24 may, for example, be of the double type disclosed by Flory Patent 2,045,984, granted June 30, 1936. The photocathode structure 12 may be formed as shown in Patent 2,248,977 issued to Flory et al., on July 15, 1941. A suitable electron lens (not shown) which may, for example, be as disclosed in the mentioned Flory et al. Patent 2,248,977, or in Patent 2,189,-319, issued February 6, 1940, to G. A. Morton, is employed to focus on the mosaic 24 the electrons emitted from the surface of photocathode 12.

The electrons impacting the mosaic 24 in turn cause secondary electrons to be released therefrom, these secondary electrons being collected by a screen 26 which is connected to the positive terminal of battery 20. The release of secondary electrons by a particular element, or area, of mosaic 24 leaves such element with a positive charge, or, in other words, with a negative charge deficiency. The amount of such deficiency is dependent upon the density of the electron image at that particular point.

The positively charged mosaic 24 is then scanned by means of an electron beam produced by an electron gun at the opposite end of tube 10, this electron gun being of any suitable type which includes a cathode 28, a grid 30, and an accelerating anode (not shown). The beam deflecting means of tube 10 is conventional, and might be magnetic, electrostatic, or a combination thereof. The deflecting electrode system is consequently omitted from the drawing for the sake of clarity and simplicity of illustration.

As the scanning beam travels across the surface of mosaic 24, electrons from the beam neutralize the positively charged mosaic elements. The beam normally supplies sufficient electrons to make up the negative charge deficiency of each image point or element. If a particular element is not positively charged, or if such positive charge is small enough so that all of the electrons available in the scanning beam during the instant of passage are not required to make up the negative charge deficiency on that element, then the remaining electrons in the beam or, in other words, those not employed to neutralize the electrostatic charge representing each image point or element, are caused to return along a path substantially parallel with the scanning beam toward the end of tube 10 from which they are emitted. Upon arriving at the end of tube 10 containing the electron gun, these returned electrons are collected by a signal plate 32 forming a part of the tube output circuit. Signal plate 32 may be of any suitable design such, for example, as a circular disc having a central aperture therein through which the scanning beam electrons emitted from the cathode 28 may pass. The signal from tube 10 is developed across an output resistor 34.

It has been stated that an image of the object 14 of Figure 1 is focused on the photocathode 12 of camera tube 10 through a striped color filter 18 by means of the lens system 16. The latter is designed so that the light emerging therefrom consists essentially of parallel rays. Interposed in the path of these parallel light rays is the color filter 18, which consists of a plurality of parallel color filter strips 36 arranged side-by-side in groups upon a translucent base member 38 (see Figures 2 and 3). For an additive system of tricolor television of the type under discussion, the color filter strips 36 may be transparent red, transparent green, and transparent blue, these colors being identified in the drawing by the letters R, G and B, respectively. Each color filter group or unit thus includes one filter strip of each color as shown in the drawing.

Between each group of color filter strips is a further strip, the purpose of which is to provide an indexing pulse output from the camera tube 10. These "indexing" strips, identified in the drawing by the reference character I, are preferably formed by channelizing the translucent base 38 so as to form a plurality of grooves or indentations therein. These indentations may appear in cross-section somewhat as shown in Figure 3—that is, of trapezoidal outline. They are filled with a diffusing material such that when the edge of the filter assembly 18 is lighted by a lamp 40 or other source of illumination (Figure 1), the diffusing material which fills each channel will stand out as a bright line or bar when viewed from the direction of the camera tube 10. One of these bright lines will appear between each set of color filter strips. The intensity of the source of illumination 40 is intended to be sufficiently high so that the brightness of the indexing strips I as viewed from the photocathode 12 is greater than the maximum brightness of any point on the object 14 as seen through any one of the color filter strips 36. Consequently, the signal developed across resistor 34 in the output of the camera tube 10 will be greater when the cathode-ray scanning beam crosses those particular areas of the mosaic 24 which correspond to the indexing strips, I, than it will be when the beam is on any other portion of the mosaic.

The width of each indexing strip, I, is preferably equal to the width of each color filter strip 36, although not necessarily so. Each of these elements, however, is very narrow, so that one complete unit, or set, consisting of three color filter strips R, G and B and one indexing strip I, together is equal approximately to the diameter of one elemental area of the object 14. Then on the photocathode 12 will appear a light image representing the object 14 as seen through the striped color filter 18, this light image consisting of colored lines separated by bars of white light. If the resolution of the camera tube 10 is such that the individual color lines on the mosaic 24 can be resolved, then the output of the camera tube 10 as developed across resistor 34 will consist of a sequence of voltages, as shown in Figure 4, which represent successive cycles of color information, and which are equally time-spaced so long as the sweep rate of the cathode-ray beam is linear. It might be said that each elemental area of the object 14 now contains a white reference signal, followed by a red sample, then a green sample, and then a blue sample voltage. The next picture element contains exactly the same information, and so on across the line. Since a televised object seldom contains any completely white portions, it is normally possible to separate the indexing pulses from the camera tube output by simple amplitude selection (above the clipping level of Figure 4) so that an indexing signal such as shown in Figure 5 is derived.

The above-described color television camera is disclosed and claimed in the aforementioned parent application of which this application is a division.

A color television transmitter according to the present invention, preferably utilizing the color camera of Figure 1, is illustrated in Figure 6. It has been stated above that the output of the camera may be an equally time-spaced wave such as shown in Figures 4—that is, a series of pulses developed by the sequential scanning of the color filter strips and indexing strips by the cathode-ray scanning beam. The amplitude-modulated signal of Figure 4 has its maximum values at the instants when the beam scans the mosaic locations corresponding to the lighted indexing portions of the color filter 18. As an illustrative example, for a 63.4 microsecond sweep time, and with an active interval of 82% as with present standards, a 2.67 megacycle interlaced dotting signal will contain approximately 277 groups of interleaved three-color and indexing signals for each line scan of the mosaic electrode 24.

Figure 7:
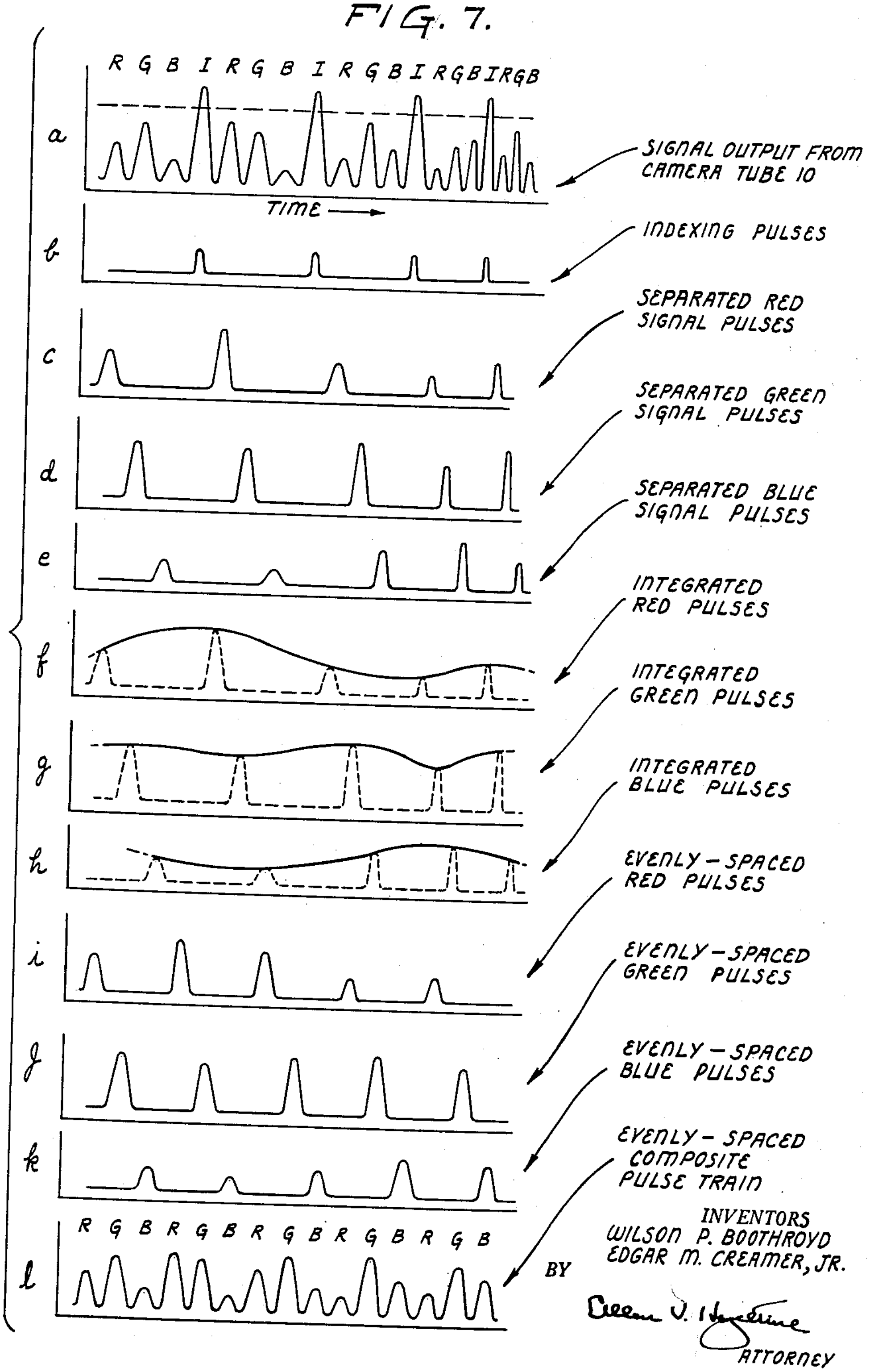
Figure 7 is a set of idealized waveforms useful in explaining the operation of the color television transmitter of Figure 6.

The electron scanning beam of the camera tube 10 is deflected in any conventional manner, and the present invention makes provision for any nonlinearities which may arise in the sweep rate of such beam and which may, for example, yield a camera tube output wave such as shown to an exaggerated degree in Figure 7(*a*). In practical applications a variation of several percent may be encountered, and while such a nonlinearity would normally be unacceptable as resulting in prohibitive distortion in a dot-multiplexing system, the present invention utilizes the indexing pulses present in the output of the camera tube to control a gating operation in a manner now to be described.

Referring to Figure 6, it will be seen that the color camera 8 of Figure 1 has its output applied in parallel to a red color signal separator 42, a green color signal separator 44, a blue color signal separator 46, and a clipper and shaper 48. In other words, the composite-color and indexing wave shown in Figures 4 and 7(*a*) is present at the input to each of these four units. It is now desired to gate such wave through each of the separators 42, 44 and 46 in such a fashion that the output of each contains information as to its particular component color only. This is accomplished by means of the indexing pulses derived from the wave and shown in Figures 5 and 7(*b*).

The clipper and shaper 48 acts to clip off the peaks of the indexing pulses above the clipping level in Figures 4 and 7(*a*) and to shape and amplify such pulses so that the output of the unit 48 consists essentially of a sine wave at indexing pulse frequency. This sine wave is now used as a time base for gating the color-component portion of the camera output signal. However, this indexing wave is preferably first passed through a two-to-one frequency divider 50 (when horizontal dot-interlacing is employed) and then applied to a phase shifter 52 which acts to provide three output waves for each input cycle, the three output waves being spaced apart by 90° electrically. The timing of the phase shifter 52 is so set that for each indexing pulse from the color camera, the three triggering impulses produced by the shifter 52 act at 90°, 180° and 270° intervals to open the color signal separators 42, 44 and 46 respectively at the precise instants when the red, green and blue color-component signals appear in the output of the camera tube. In this manner no gating will occur until such time as an indexing pulse has been applied to the clipper and shaper 48. Since the sine wave output of the divider 50 is frequency-modulated, any filtering action of the clipper and shaper 48 must be such as to permit modulation of the basic indexing rate in accordance with the sweep nonlinearity.

From the color signal separators 42, 44 and 46 there has now been obtained three signals (shown in curves (*c*), (*d*) and (*e*) of Figure 7) which have been derived by generally uniform gating at a frequency which is only approximately correct—that is, the signals have been in effect frequency-modulated by the nonlinearity of the camera sweep. If now each of these three color-component pulse trains is applied to a filter having a passband which is slightly less than the average sampling frequency in each component-color channel, then the output of each such filter will be a substantially continuous signal, approximately as shown in curves (*f*), (*g*) and (*h*) of Figure 7, similar to the signal which is derived in each color channel of a multi-tube simultaneous system in which due attention is given to sweep linearity and registration. For example, if the sampling rate is 2.67 megacycles per second, then the passband of each filter should be slightly under this value. Thus in Figure 6 the output of the red color separator 42 is passed through a filter 54 having a passband from zero to approximately 2.5 megacycles, while the output of the green and blue color separators 44 and 46 are similarly passed through two filters 56 and 58, respectively, having the same cut-off frequency.

The action of the filters 54, 56 and 58 thus is an "integrating" one, the applied pulses being "smoothed" or "stretched out" so as to leave no gaps therebetween. A somewhat similar result may be achieved by utilizing a "clamping circuit" in place of each filter unit 54, 56 and 58, or by employing any other suitable form of integrating device.

Since the respective outputs of the filters 54, 56 and 58 are separate component-color video signals, they may be applied to any form of color transmitter either of the simultaneous or sequential type. However, in accordance with one embodiment of the present invention, the sequentially-produced component-color signals are now "re-sampled" for transmission as dots or pulses of color information.

The apparatus for carrying out one form of re-sampling or re-dotting includes three modulating units, a red modulator 60 connected to the output of the filter 54, a green modulator 62 receiving the output of the filter 56, and a blue modulator 64 connected to the output of the filter 58. In order that these three component-color signals be successively sampled at equally-spaced time instants, a gating, or sampling wave having a frequency of 3.189375 megacycles (hereinafter designated for convenience as 3.19 megacycles) is developed by a frequency divider 66 which is connected to the output of a crystal oscillator 68 operating at some suitable multiple frequency such as 12.7575 megacycles. The 3.19 megacycle sampling wave from the frequency divider 28 passes through a phase shifting unit 70 which acts to provide three output waves each of which is displaced in phase by approximately 120°. The phase shifter 70 may operate in a manner somewhat similar to the phase-shifting unit 52 mentioned above. The three out-of-phase voltage variations from the shifter 70 are respectively applied to the modulators 60, 62 and 64 so as to activate the latter in timed sequence and yield the three pulse trains shown in curves (*i*) (*j*) and (*k*) of Figure 7. The outputs of modulators are combined to form a composite pulse train (curve (*l*)) for application to a low-pass filter 72, the pulses of this composite train occurring at a rate of approximately 9.567 megacycles per second.

The filter 72 is designed to have a passband from zero frequency to approximately four megacycles, with a sharp cut-off at the latter point. The output of the filter 72 is applied to an equalizer unit 74 which acts as a phase and amplitude corrector. The two units 72 and 74 in combination have the property of passing sampled information at a rate of 8 million samples per second without appreciable crosstalk between adjacent pulses. Amplitude versus frequency curves for these units are set forth in the drawing, although the response of each unit is of course chosen in view of the particular operating characteristics of the system. The output of the equalizer 74 is then applied to modulate a standard television transmitter 76 which is connected to antenna 78. It will be understood that, if desired, the equalizer unit 74 may be of the type shown in a copending United States patent application of W. P. Boothroyd, filed January 14, 1949, as Serial No. 70,951.

The sampling circuit which includes the modulators 60, 62 and 64 must operate in synchronism with a corresponding sampling device at the receiver in order to avoid distortion of the reproduced image. Means for coordinating the operation of the two samplers is fully set forth in a copending United States patent application of R. C. Moore, Serial No. 175,438, filed July 22, 1950, and it will only be stated herein that this means includes a sync and burst injector unit 80 and a burst shaper 82, each of which is connected to a synchronizing generator 84. The latter operates to supply horizontal and vertical blanking pulses in the usual manner to the color camera 8, such as by application to the screen 26 of the camera tube 10 in Figure 1. The burst shaper 82 acts as a gate which is opened by the synchronizing generator 84 during a portion of each horizontal blanking interval to permit passage therethrough of the 3.19 megacycle wave developed by the frequency divider 66. By this mode of operation, a burst of high-frequency energy is applied through the injector 80 to the input of filter 72 during horizontal blanking when no video signal is being received from the color camera. As brought out in a further copending United States patent application, Serial No. 139,928, filed January 21, 1950, by W. P. Boothroyd and E. M. Creamer, Jr., this periodic burst of high-frequency energy is utilized for synchronizing the operation of the receiver sampling apparatus. In addition, a vertical timing pulse is obtained from the sync generator 84 and applied to the burst shaper 82 over a connection 86 so that the 3.19 megacycle output of the frequency divider 66 is prevented from entering the video circuit during the vertical equalizing and blanking pulse periods. Otherwise, the burst energy may adversely affect the vertical synchronizing process at the receiver.

In application Serial No. 139,928, it was stated that the phase of the 3.19 megacycle wave may be reversed at a 15-cycle rate at the transmitter (during vertical retrace) in order to reverse the phase of the receiver sampler and hence obtain horizontal interlacing of the dot information. In other words, by such an expedient the matrix of points at which information is extracted from the original scene and reproduced on the display cathode-ray tube may be shifted horizontally, by an amount equal to one-half the distance between the centers of adjacent dots in the picture produced during one field, within every other vertical blanking interval. In application Serial No. 175,438 the phase of the 3.19 megacycle wave as applied to the filter 72 through the burst shaper 80 remains constant, and the synchronizing pulse output of the generator 84 is caused to vary periodically.

It has been stated above that the color camera 8 is supplied with blanking pulses directly from the sync generator 84, and also that the latter acts to control the burst shaper 82, opening and closing such unit so that the injection of the high-frequency 3.19 megacycle energy into the video circuit occurs preferably during that portion of the horizontal blanking interval which follows the horizontal synchronizing pulse itself. Furthermore, the mixed sync pulses are applied directly to the filter 72 from the generator 84 through the sync and burst injector 80. These mixed sync pulses also control in part the gating operation of the burst shaper 82.

It is desirable that the operation of the sync generator 84 be locked in with the operation of the horizontal oscillator 68 which provides the high-frequency dotting wave through the frequency divider 66. This is brought about by feeding a portion of the output of the oscillator 68 to a further divider 88 which reduces the frequency of the 12.7575 megacycle wave to a value of 94.5 kilocycles. The generator 84 is connected to the divider 88 through a gate 90, so that, when the latter is open, both the frequency and phase of the sync pulses from the generator 84 are the same as that of the wave from divider 88.

In order to bring about horizontal dot-interlacing without periodically shifting the phase of the 3.19 megacycle wave output of the divider 66, it is necessary that the time relation between the sampling wave and the sync pulses be periodically varied through control of the sync generator 84. If the timing of the sync pulses produced by the sync generator is shifted at a 30-cycle rate, then the desired relationship between the sync pulses and the sampling wave will be established. For this purpose, there is provided the keyer 92.

This keyer unit 92, which actually is a 30-cycle square wave generator coordinated with the sync generator 84 by means of vertical timing pulses obtained from the latter over a connection 94, is designed to produce two 180° out-of-phase square waves which change in polarity every one-sixtieth of a second. Connected to the output of the frequency divider 88 is a delay circuit 96 which acts to provide a delay interval equal to one-quarter the period of the dot frequency. For a system such as is described above, this period of delay amounts to approximately $\frac{1}{12.76}$ microsecond. The wave output of the delay circuit 96 is then applied to the sync generator 84 through a gate 98. Each sync pulse from the generator 84 thus has the same time relation with respect to a particular pulse received through gate 98 from the delay circuit 96 that it has with respect to this same pulse when the latter is received directly from divider 88 through gate 90.

As shown in the drawing, the keyer 92 operates alternately to open and close the gates 90 and 98, so that the timing of the 94.5 kilocycle control wave from the divider 88 is shifted every one-sixtieth of a second correspondingly to change the time position of the sync pulses in the output of the generator 84 relative to that of the sampling wave from divider 66. This is equivalent to advancing the positions of the dots in the image reproduced at the receiver by one-quarter of the horizontal dot spacing in alternate fields, and hence improved interlacing is accomplished without the necessity of changing the phase of the sampling apparatus either at the transmitter or at the receiver.

In place of the elements 48, 50 and 52 of Figure 6, it is possible to substitute other gating devices which will perform satisfactorily for the purpose of the present disclosure. For example, the continuously driven gating apparatus of the drawing may be replaced by a triggered gate which operates in response to the reception of an indexing pulse from the color camera 8 sequentially to open the three gates 42, 44 and 46 at the proper time instants. Such a triggered gate, for example, may comprise a chain-type impulse generator the normal period of operation of which is preferably set slightly longer than the maximum time required during each sweep period for the cathode-ray scanning beam to cross successive indexing strips. In this manner the red, green and blue color signals will be separated into their respective channels, with the gating always occurring while the beam is centered on a proper mosaic area.

We claim:

1. In a color television transmitter: a camera tube having a target electrode; means for developing upon said target electrode an electrostatic charge image descriptive of an optical multi-color image to be televised, each elemental area of said optical image being represented by a corresponding surface portion of said target electrode, the latter being designed for successive traversal by the cathode-ray beam of said camera tube during each line-scanning operation, each of the said surface portions of said target electrode including at least two regions respectively representative of different chromatic aspects of that elemental area of the optical image covered by that particular surface portion and in addition at least one region designed to produce an indexing signal pulse when impinged by said cathode-ray beam, whereby the signal output of said camera tube during each line-scanning operation will be a sequence of sets of component-color pulses and indexing pulses; a plurality of output channels equal in number to the number of color-representative regions in each target surface portion, each output channel being intended for component-color signal pulses derived from similar color-representative regions of said target; and gating means, controlled by the said indexing signals, for directing the component-color signal pulses sequentially appearing in the output of said camera tube into the respective output channels.

2. A color television transmitter according to claim 1, further including a plurality of filters to which the sequentially-appearing component-color signal pulses in the said output channels are respectively applied, the passband of each such filter being less than the recurrence frequency of its associated component-color signal pulses, whereby a plurality of substantially continuous filter output waves are obtained.

3. A color television transmitter according to claim 2, further comprising a sampling device in the output of each of said filters, each such sampling device operating at a constant rate so as to yield a series of component-color pulses the time-spacing of which is uniform regardless of any variation which may occur in the time-spacing of the sequentially-appearing component-color pulses at the input to its associated filter.

4. In a color television transmitter: a camera tube having a target electrode; means for developing upon said target electrode an electrostatic charge image indicative of an optical multi-color image to be televised, said target electrode being made up of a plurality of sets of elongated color-representative areas lying substantially transverse to the line-scanning action of the cathode-ray beam of said tube, each such set of elongated target areas including one area representative of each one of the primary colors of that elemental region of the optical image covered thereby, and, in addition, one area designed to yield an indexing pulse when impinged by said cathode-ray beam, whereby the signal output of said camera tube during each line-scanning operation will be a sequence of sets of primary-color signal pulses and indexing signal pulses; a circuit for separating the indexing signal pulses in the output of said camera tube from the remaining primary-color signal pulses; a plurality of color channels each intended to receive signals of but one primary color; and gating means, controlled by the said separated indexing signal pulses, for directing the sequentially-appearing primary-color signal pulses in the output of said camera tube into the respective color channels regardless of whether or not the said cathode-ray beam line-scanning action takes place at a constant rate with respect to time.

5. A color television transmitter according to claim 4, further including a plurality of filters respectively receiving the sequentially-appearing primary-color signal pulses in the said color channels, the passband of each such filter being less than the recurrence frequency of the particular primary-color signal pulses received thereby, as a result of which the output of each filter comprises a substantially continuous primary-color signal wave.

6. A color television transmitter according to claim 4, in which the said gating means is normally inoperative until triggered by the reception of one of the said indexing signal pulses, whereupon said gating means acts to direct into their respective color channels the primary-color signal pulses derived from the scanning of one only of the said sets of elongated target areas, following which the said gating means again becomes inoperative until triggered by the next succeeding indexing signal pulse.

7. In a color television system, and in combination, a screen having a cyclically repeated plurality of sets of parallel strips, each set comprising strips corresponding in number and in predetermined order to a number of component colors to be reproduced, means for scanning the said screen by moving an electron beam transversely in a single direction across all of the strips to scan by lines, means responsive to the electron beam for generating a signal in timed relation to the scanning thereby of the strips, the last said means comprising means for clipping video signals to produce a signal corresponding to video signal above a predetermined magnitude, such magnitude being greater than the maximum video signal to be transmitted, and means controlled by the said signal for generating a plurality of video switching signals corresponding in number to the number of component colors, in frequency to the scanning of the sets of strips by the electron beam and in phase to the spacing of strips within a set.

8. Color television apparatus comprising an image pickup device for generating a signal train comprising signal elements intercalated according to a color sequence and representative of different color components of elements of the image, means for producing signal elements recurring in a predetermined sequence, in said signal train and confined to a separate amplitude range from signal elements "representing" said different color components, a plurality of signal channels with one for each of said color components, a gate leading to each signal channel, means for applying said signal train to said gates, and means responsive to said recurring signal elements for opening said gates in succession to admit the signal elements representative of said different color components to the corresponding signal channels.

9. Color television apparatus comprising an image pickup device for generating a signal train comprising signal elements intercalated according to a color sequence and representative of different color components of elements of the image, means for producing signal elements recurring in a predetermined sequence in said signal train and confined to a separate amplitude range from signal elements representing said different color components, a plurality of signal channels with one for each of said color components, a gate leading to each signal channel, means for applying said signal train to said gates, and a gating pulse generator synchronized by said recurring signal elements, said gates being responsive to pulses from said pulse generator to cause said gates to open in succession to admit the signal elements representative of different color components to the corresponding signal channels.

10. A color television pickup tube system comprising in combination, a pickup tube including an electron target structure, a plurality of interleaved sets of optical filter strips having respectively different component color pass bands, at least one set of reference strips associated with said filter strips, means for generating an electron beam, means for scanning said target structure with said electron beam, means including said filter strips for developing a composite signal containing information relative to the different color components of a subject image in response to said scanning, means for deriving a reference signal in relation to said reference strips in response to said scanning, and means for utilizing said reference signal to derive a component color signal from said composite signal.

11. A pickup tube system in accordance with claim 10 wherein said composite signal is derived from the return beam of said pickup tube.

12. A color television pickup tube system comprising, in combination, an image pickup tube including a target, a plurality of interleaved sets of optical filter strips of respectively different component color response positioned to intercept light directed to said pickup tube from a subject to be televised, at least one set of reference strips associated with said optical filter strips, means for developing an electron beam in said pickup tube, deflecting means for causing said beam to traverse said target, means for deriving from said pickup tube in response to said traversal a composite signal including information concerning each of the respective color components of the subject, a plurality of modulators each having input and output circuits, means for impressing said composite signal upon the input circuits of all of said modulators, means for deriving reference signals in relation to said reference strips in response to said traversal, and means for impressing each of the respective reference signals upon the input circuit of a respectively different one of said modulators whereby each of said modulators provides an output signal containing information concerning but a respective one of said color components.

13. A color television pickup system comprising, in combination, a pickup tube including an electron target structure; at least one set of reference strips positionally related to target areas representative of light of a component color from a subject to be televised; said pickup tube including means for generating an electron beam, means for causing said beam to trace a scanning raster upon said target structure, and means for collecting the electrons of said beam returned from said target structure throughout said raster tracing; means for deriving reference signals in relation to said reference strips in response to said raster tracing; a plurality of modulators;

means for applying the return beam signal appearing at said collecting means to each of said plurality of modulators; and means for additionally applying to each of said plurality of modulators a respectively different one of said reference signals.

14. A color television camera comprising in combination a color image pickup tube including an electron target structure, means for developing an electron beam, and means for causing said beam to trace a scanning raster upon said target structure; a plurality of interleaved sets of optical filter strips having respectively different components color passbands and through which light directed to said pickup tube from a subject to be televised passes; at least one set of reference strips positionally related to said interleaved filter strip sets; means for deriving from said pickup tube through the tracing of said raster a composite signal which includes respective components representative of different component color aspects of said subject; means for deriving reference signals in relation to said reference strips throughout said raster tracing; and means for utilizing each of said respective reference signals to separate a respectively different one of said components from said composite signal.

15. In a color television system, a pickup tube of the type which produces an image-representative signal by scanning action of an electron beam, a plurality of optical filter elements arranged so as to cause said signal to comprise signal components successively and repetitively representative of a number of different chromatic aspects of elemental areas of the image, means including a plurality of reference elements associated with said filter elements for causing production of reference signal components by the scanning action of said beam, a plurality of signal channels equal in number to the number of different chromatic aspects represented by the first-mentioned signal components, means for supplying said image-representative signal to said channels, and means controlled by said reference signal components for controlling said signal channels so to effect transfer of the different chromaticity-representative signal components through the different signal channels.

16. A color television image pickup system according to claim 15, wherein said filter elements and said reference elements are in the form of strips.

17. In a color television system, a camera tube for producing a signal voltage indicative of the magnitudes of the color components of the color content of an object, said tube comprising photosensitive means including an image surface scanned by an electron beam in successive line scannings, means for directing light from said object onto said photosensitive means, color filter means for rendering successive elemental areas of said surface responsive to light of different colors derived from said object, whereby the scanning of said surface produces image signal components which are successively and repetitively representative of different chromatic aspects of elemental areas of said object, means including reference elements associated with said color filter means for producing reference signal components in response to the scanning of said surface, a plurality of signal channels equal in number to the number of different chromatic aspects represented by the first-mentioned signal components, means for supplying said first-mentioned signal components to said channels, and means controlled by said reference signal components for controlling said signal channels so as to effect transfer of the different chromaticity-representative signal components through the different channels.

18. In a color television transmitter, means for producing pulses which are successively and repetitively representative of a number of different chromatic aspects of elemental areas of an object being televised, means for producing indexing signal pulses which bear a predetermined time relation to said chromaticity-representative pulses, a plurality of signal channels equal in number to the number of chromatic aspects represented by said first signal pulses, means controlled by said indexing signal pulses for controlling said signal channels so as to effect transfer of the different chromaticity-representative pulses through the different signal channels, a filter in each of said channels having a pass band less than the recurrence frequency of the chromaticity-representative pulses, whereby a substantially continuous wave is produced in the output of each filter, and means for sampling the output of each filter at a constant rate so as to yield a series of chromaticity-representative pulses the time-spacing of which is uniform regardless of any variation which may occur in the time-spacing of the pulses at the input of the filter.

References Cited in the file of this patent

UNITED STATES PATENTS 2,630,485 Heikes et al. ---------- Mar. 3, 1953